S. M. BELLRINGER.
DRILL TANG AND SOCKET.
APPLICATION FILED DEC. 20, 1919.
1,374,631.
Patented Apr. 12, 1921.
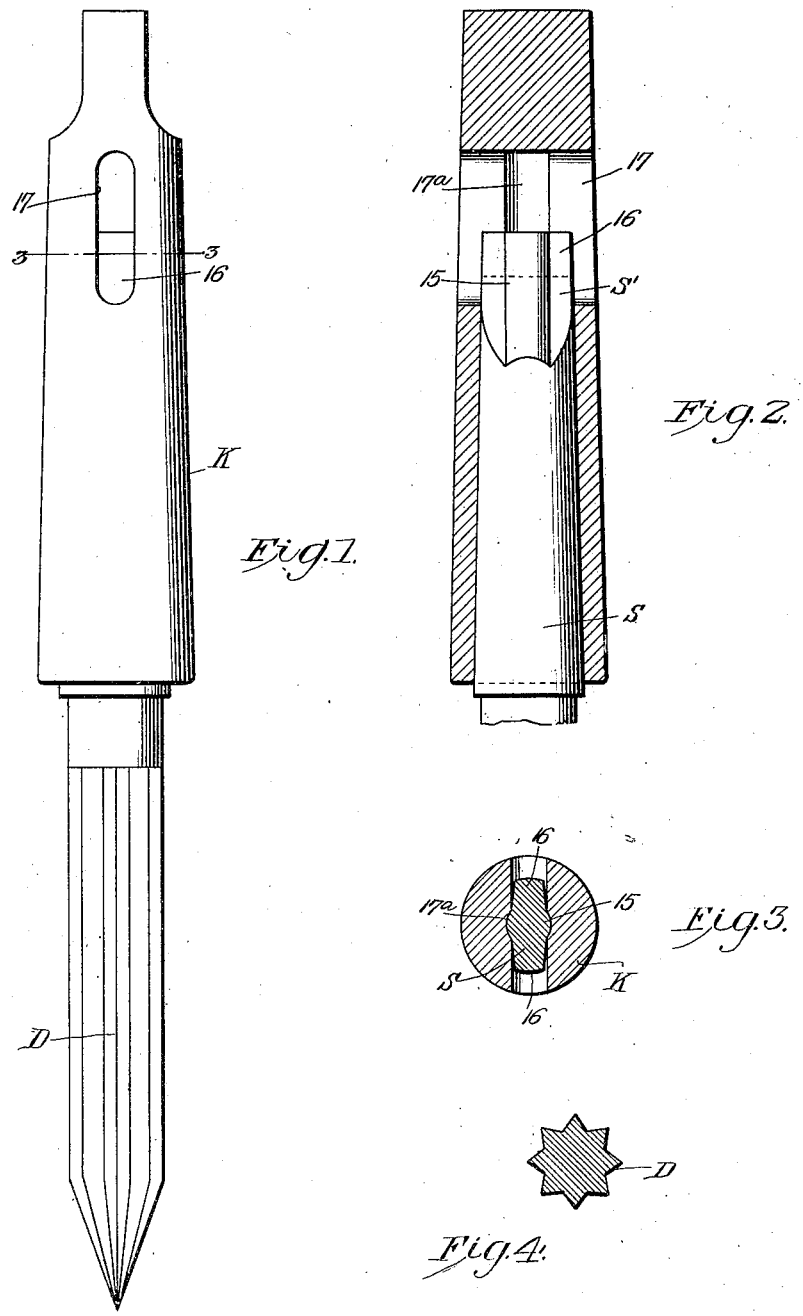
WITNESSES
INVENTOR
S.M.Bellringer,
BY
ATTORNEYS

UNITED STATES PATENT OFFICE.

SIDNEY MERRITT BELLRINGER, OF BALTIMORE, MARYLAND, ASSIGNOR TO WAYNE TOOL MANUFACTURING COMPANY, OF WAYNESBORO, PENNSYLVANIA, A CORPORATION OF PENNSYLVANIA.

DRILL TANG AND SOCKET.

1,374,631.           Specification of Letters Patent.      Patented Apr. 12, 1921.

Application filed December 20, 1919. Serial No. 346,287.

*To all whom it may concern:*

Be it known that I, SIDNEY MERRITT BELLRINGER, a subject of the King of England, and a resident of the city of Baltimore, in the State of Maryland, have invented certain new and useful Improvements in Drill Tangs and Sockets, of which the following is a specification.

My invention relates to drills, reamers or the like and sockets therefor.

The purpose of my invention is the provision of a drill tang and a coacting socket for preventing the twisting off of the tang when the drill shank becomes loose within the socket.

I will describe one form of drill socket and one form of tang embodying my invention and will then point out the novel features thereof in claims.

In the accompanying drawings:—

Figure 1 is a view, showing in side elevation one form of drill socket and drill in applied position within the socket;

Fig. 2 is a longitudinal sectional view of the socket shown in Fig. 1 with the drill shank and tang in elevation;

Fig. 3 is a transverse sectional view, taken on the line 3—3 of Fig. 1; and

Fig. 4 is a transverse section of the drill head shown in Fig. 1.

Similar reference characters refer to similar parts in each of the several views.

Referring specifically to the drawings, D designates the drill which, as shown in Figs. 1 and 4 is of the reamer type, such drill including a shank S which is of conical formation so as to fit snugly within a conical socket K. The tang of the drill shank S is designated at S' and as shown in Figs. 2 and 3 is formed with a central circular portion 15 from which extends at diametrically opposite points a pair of arms or wings 16 that taper in width from their point of connection with the circular portion, as clearly shown in Fig. 3. The drill socket K is provided with the usual transverse slot 17, but its side walls are grooved longitudinally, as at 17ª to accommodate the circular portion 15 of the tang when the drill shank is inserted within the socket. The arms in the applied position of the drill shank, are disposed within the slot 17. As the side walls of the transverse slot 17 are parallel, that is, with the exception of the grooves 17ª, and the side walls of the arms 16 are inclined, it is clear that when the shank is rotated within the socket, the arms will abut the walls of the slot at their point of connection with the circular portion 15 so that the leverage is comparatively short. This shortening of leverage renders the tang extremely strong and durable and prevents the same from being twisted off when the drill shank S becomes loose within the socket K.

It will be noted by reference to Fig. 3 that the normal thickness of the usual drill tang has not been sacrificed but in fact has been increased by virtue of the circular portion 15, and as this circular portion receives substantially all of the circumferential stress imparted to the drill shank, it is manifest that in addition to the shortening of the leverage the strength of the tang is materially increased as a result of this circular portion.

Although I have herein shown and described only one form of drill socket and drill tang embodying my invention, it is to be understood that various changes and modifications may be resorted to without departing from the spirit of the invention and the spirit and scope of the appended claims.

Having thus described my invention, I claim:

1. In combination, a conical drill socket having a transverse slot formed therein and grooves formed in the walls of said slot, and a conical drill shank disposed within said socket and including a tang projecting into said slot, said tang comprising a circular portion adapted to fit within said grooves, and arms extending from the circular portion at diametrically opposite points and tapered in width from their point of connection with the circular portion, whereby the arms are permitted to contact with the sides of the slot at points adjacent the circular portion only.

2. In combination, a drill socket having a transverse slot formed therein, and grooves within the walls of said slot, and a drill shank disposed within said socket and including a tang, said tang comprising a thickened portion adapted to be disposed within said grooves and arms formed integral with said portion and tapered in width to cause the same to engage the walls of said slot only at their point of connection with the thickened portion.

3. A tool shank including a tang comprising a circular portion and arms extending from said portion at diametrically opposite points and tapered in width, said tapered arms in operation being free of any contacting parts.

4. A tool shank including a tang comprising a central thickened portion and relatively thin portions extending laterally from the thickened portion and tapering in width, said tapered portion, in operation, being free of any contacting parts.

SIDNEY MERRITT BELLRINGER.